(12) United States Patent
Toyoshiba (10) Patent No.: US 11,544,309 B2
(45) Date of Patent: Jan. 3, 2023

(54) SIMILARITY INDEX VALUE COMPUTATION APPARATUS, SIMILARITY SEARCH APPARATUS, AND SIMILARITY INDEX VALUE COMPUTATION PROGRAM (71) Applicant: FRONTEO, Inc., Tokyo (JP)

(72) Inventor: Hiroyoshi Toyoshiba, Tokyo (JP)

(73) Assignee: FRONTEO, Inc., Tokyo (JP)

(*) Notice: Subject to any disclaimer, the term of this patent is extended or adjusted under 35 U.S.C. 154(b) by 221 days.

(21) Appl. No.: 16/759,474

(22) PCT Filed: Oct. 29, 2018

(86) PCT No.: PCT/JP2018/040056
§ 371 (c)(1),
(2) Date: Apr. 27, 2020

(87) PCT Pub. No.: WO2019/093172
PCT Pub. Date: May 16, 2019

(65) Prior Publication Data
US 2020/0285661 A1    Sep. 10, 2020

(30) Foreign Application Priority Data
Nov. 7, 2017 (JP) .............................. JP2017-214388

(51) Int. Cl.
G06F 16/33       (2019.01)
G06F 16/31       (2019.01)
(52) U.S. Cl.
CPC ........ *G06F 16/3347* (2019.01); *G06F 16/313* (2019.01)
(58) Field of Classification Search
CPC .................. G06F 16/3347; G06F 16/313
(Continued)

(56) References Cited

U.S. PATENT DOCUMENTS

2003/0140033 A1*  7/2003  Iizuka .................. G06F 16/284
2003/0217066 A1  11/2003  Kayahara
(Continued)

FOREIGN PATENT DOCUMENTS

JP    H07295994 A    11/1995
JP    2002259445 A    9/2002
JP    2003288362 A    10/2003

OTHER PUBLICATIONS

Latent Semantic Analysis, Wikipedia, Internet:<URL: https://ia.wikipedia.org/wiki/潜在意味解析.
(Continued)

Primary Examiner — Kimberly L Wilson
(74) Attorney, Agent, or Firm — Polsinelli PC (57) ABSTRACT A word extraction unit 11 that analyzes m texts to extract n words, a vector computation unit 12 that converts each of the m texts into a q-dimension vector and each of the n words into a q-dimension vector, thereby computing m text vectors including q axis components and n word vectors including q axis components, and an index value computation unit 13 that takes each of inner products of the m text vectors and the n word vectors, thereby computing a similarity index value reflecting a relationship between the m texts and the n words are included, and it is possible to obtain a similarity index value representing which word contributes to which text and to what extent as an inner product value by calculating an inner product of a text vector computed from a text and a word vector computed from a word included in the text.

15 Claims, 4 Drawing Sheets (58) Field of Classification Search
USPC .......................................................... 707/730
See application file for complete search history.

(56) References Cited

U.S. PATENT DOCUMENTS

| | | | | |
|---|---|---|---|---|
| 2006/0112027 A1* | 5/2006 | Okamoto | ............... | G06N 20/00 |
| | | | | 706/14 |
| 2007/0067281 A1* | 3/2007 | Matveeva | ............. | G06F 16/334 |
| | | | | 707/999.005 |
| 2008/0170810 A1* | 7/2008 | Wu | ...................... | G06V 10/462 |
| | | | | 382/305 |
| 2009/0028446 A1* | 1/2009 | Wu | ...................... | G06V 30/268 |
| | | | | 382/229 |
| 2017/0161275 A1* | 6/2017 | Speer | ..................... | G06F 16/243 |
| 2018/0253496 A1* | 9/2018 | Natchu | ................. | G06F 16/951 |
| 2019/0087490 A1* | 3/2019 | Liu | .......................... | G06N 3/08 |

OTHER PUBLICATIONS

Kita et al., "Information retrieval algorithm", Kyoritsu Shuppan Co., Ltd., Jan. 1, 2002, pp. 33-34.

Le et al., "Distributed Representations of Sentences and Documents", Google Inc., Proceedings of the 31$^{st}$ International Conference on Machine Learning held in Beijing, China on Jun. 22-24, 2014.

* cited by examiner

SIMILARITY INDEX VALUE COMPUTATION APPARATUS, SIMILARITY SEARCH APPARATUS, AND SIMILARITY INDEX VALUE COMPUTATION PROGRAM

CROSS REFERENCE TO RELATED APPLICATIONS

This application is a National Phase filing under 35 U.S.C. § 371 of PCT/JP2018/040056 filed on 29 Oct. 2018; which application in turn claims priority to Application No. 2017-214388 filed in Japan on 7 Nov. 2017. The entire contents of each application are hereby incorporated by reference.

TECHNICAL FIELD

The present invention relates to a similarity index value computation apparatus, a similar text search apparatus, and a similarity index value computation program, and particularly relates to a technology for computing an index value of similarity related to a text including a plurality of words and a technology for performing similarity search using this index value.

BACKGROUND ART

Conventionally, a technology for searching another text similar to a text input as a search key from a large number texts stored in a database has been widely used. In this type of search technology, basically, a certain feature quantity is computed for each text, and a text having a similar feature quantity is searched. There has been known a technology for computing a text vector as one feature quantity (for example, see Patent Documents 1 and 2).

In an information search apparatus described in Patent Document 1, a document of a search answer is analyzed to extract independent words, and a word vector is read out of the obtained independent words for an independent word registered in a vector generation dictionary. Then, text vectors representing features of texts are obtained from all word vectors obtained in all texts, a distance between the texts is obtained by comparing the text vectors, and classification is performed using the distance.

A corresponding category search system described in Patent Document 2 searches for a pair of Japanese and English documents having similar meanings. The corresponding category search system performs a morphological analysis process on all Japanese and English documents included in learning data, and calculates a corresponding multidimensional word vector for each of the Japanese and English words obtained as a result. Then, a document vector in which the sum of the word vectors corresponding to all the words included in each document is normalized (the length of the vector is 1) is calculated, and a pair of Japanese and English documents having a highest relevance (a value of the inner product is large) is searched using the document vector corresponding to the Japanese document and the document vector corresponding to the English document.

In addition, there has been known a thesis describing evaluation of a text or a document by a paragraph vector (for example, see Non-Patent Document 1). In a technology described in Non-Patent Document 1, similarly to Patent Documents 1 and 2, a word vector is computed for a word included in a text, and a paragraph vector is computed using the word vector.

Patent Document 1: JP-A-7-295994
Patent Document 2: JP-A-2002-259445

Non-Patent Document

Non-Patent Document 1: "Distributed Representations of Sentences and Documents" by Quoc Le and Tomas Mikolov, Google Inc, Proceedings of the 31st International Conference on Machine Learning Held in Bejing, China on 22-24 Jun. 2014

SUMMARY OF THE INVENTION

Technical Problem

Each of the technologies described in Patent Documents 1 and 2 and Non-Patent Document 1 has a mechanism for calculating text vectors as feature quantities of texts, comparing the text vectors, or calculating an inner product of the text vectors, thereby classifying the texts or searching for similar texts.

However, a conventional similarity evaluation method using only a text vector as an index has a problem that evaluation accuracy cannot be sufficiently increased since a text includes a combination of a plurality of words, whereas it is not accurately evaluated which word contributes to which text and to what extent.

Note that the text vectors described in Patent Documents 1 and 2 and Non-Patent Document 1 are all computed by a predetermined calculation using a word vector. However, Patent Document 1 does not disclose a specific method for determining a text vector from a word vector. In the technology described in Patent Document 2, since the sum of the word vectors corresponding to all the words included in the document is simply normalized to be a document vector, the word vector of each word used in the document is rounded as the sum. In the technology described in Non-Patent Document 1, even though a word vector is used in a process of obtaining a paragraph vector, the word vector is not used as an index for evaluating a text or a document.

The invention has been made to solve such a problem, and an object of the invention is to make it possible to improve the similarity evaluation accuracy more than before.

Solution to Problem

To solve the above-mentioned problem, in a similarity index value computation apparatus of the invention, m texts are analyzed to extract n words from the m texts, each of the m texts is converted into a q-dimensional vector according to a predetermined rule, thereby computing m text vectors including q axis components, and each of the n words is converted into a q-dimensional vector according to a predetermined rule, thereby computing n word vectors including q axis components. Then, each of the inner products of the m text vectors and the n word vectors is taken to compute a similarity index value reflecting a relationship between the m texts and the n words. Here, a probability that one of the m texts is predicted from one of the n words or a probability that one of the n words is predicted from one of the m texts is computed for all combinations of the m texts and the n words, a total value thereof is set as a target variable, and a text vector and a word vector maximizing the target variable are computed.

Advantageous Effects of the Invention

According to the invention configured as described above, since an inner product of a text vector computed from a text and a word vector computed from a word included in the text is calculated to compute a similarity index value reflecting a relationship between the text and the word, it is possible to detect which word contributes to which text and to what extent as an inner product value. Therefore, it is possible to improve similarity evaluation accuracy more than before using a similarity index value of the invention obtained in this way.

MODE FOR CARRYING OUT THE INVENTION

Figure 1:
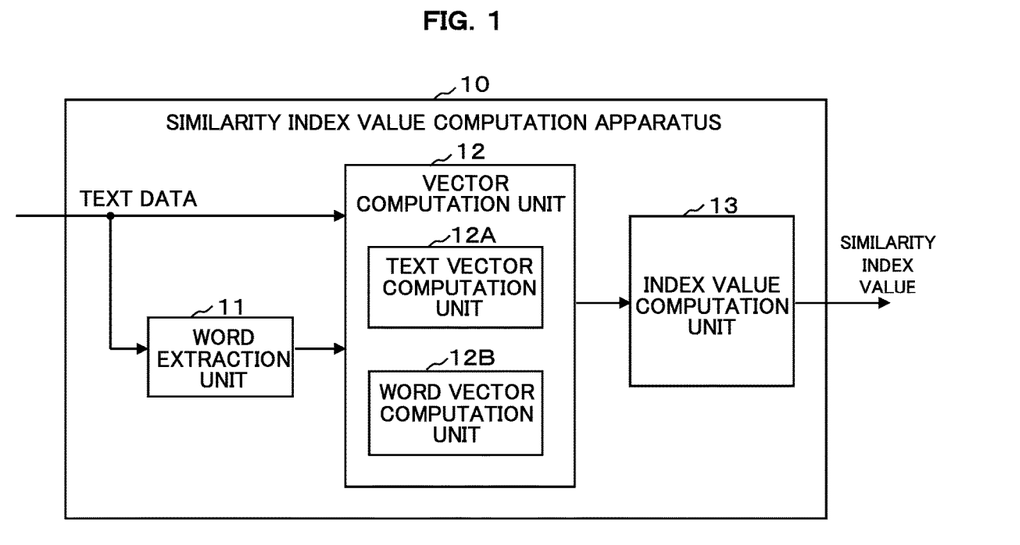
FIG. 1 is a block diagram illustrating a functional configuration example of a similarity index value computation apparatus according to an embodiment.

Hereinafter, an embodiment of the invention will be described with reference to drawings. FIG. 1 is a block diagram illustrating a functional configuration example of a similarity index value computation apparatus according to the present embodiment. A similarity index value computation apparatus 10 of the present embodiment inputs text data related to a text, and computes and outputs a similarity index value reflecting a relationship between the text and a word contained therein. The similarity index value computation apparatus 10 includes a word extraction unit 11, a vector computation unit 12, and an index value computation unit 13 as a functional configuration thereof. The vector computation unit 12 includes a text vector computation unit 12A and a word vector computation unit 12B as a more specific functional configuration.

Each of the functional blocks 11 to 13 can be configured by any of hardware, a Digital Signal Processor (DSP), and software. For example, in the case of being configured by software, each of the functional blocks 11 to 13 actually includes a CPU, a RAM, a ROM, etc. of a computer, and is implemented by operation of a program stored in a recording medium such as a RAM, a ROM, a hard disk, or a semiconductor memory.

The word extraction unit 11 analyzes m texts (m is an arbitrary integer of 2 or more) and extracts n words (n is an arbitrary integer of 2 or more) from the m texts. Here, a text to be analyzed may include one sentence (unit divided by a period) or include a plurality of sentences. A text including a plurality of sentences may correspond to some or all of texts included in one document.

In addition, as the analysis of a text, for example, a known morphological analysis can be used. Here, the word extraction unit 11 may extract morphemes of all parts of speech divided by morphological analysis as words, or may extract only morphemes of specific parts of speech as words.

Note that m texts may include a plurality of the same words. In this case, the word extraction unit 11 does not extract a plurality of the same words, and extracts only one word. That is, n words extracted by the word extraction unit 11 refer to n types of words.

The vector computation unit 12 computes m text vectors and n word vectors from m texts and n words. Here, the text vector computation unit 12A converts each of the m texts targeted for analysis by the word extraction unit 11 into a q-dimensional vector according to a predetermined rule, thereby computing m text vectors including q (q is an arbitrary integer of 2 or more) axis components. In addition, the word vector computation unit 12B converts each of the n words extracted by the word extraction unit 11 into a q-dimensional vector according to a predetermined rule, thereby computing n word vectors including q axis components.

In the present embodiment, as an example, a text vector and a word vector are computed as follows. Now, a set S=<d∈D, w∈W> including the m texts and the n words is considered. Here, a text vector $\vec{d_i}$ and a word vector $\vec{w_j}$ (hereinafter, the symbol "→" indicates a vector) are associated with each text $d_i$ (i=1, 2, ..., m) and each word $w_j$ (j=1, 2, ..., n), respectively. Then, a probability $P(w_j|d_i)$ shown in the following Equation (1) is calculated with respect to an arbitrary word $w_j$ and an arbitrary text $d_i$.

[Equation 1]

$$P(w_j | d_i) = \frac{\exp(\vec{w_j} \cdot \vec{d_i})}{\sum_{k=1}^{n} \exp(\vec{w_k} \cdot \vec{d_i})} \quad (1)$$

Note that the probability $P(w_j|d_i)$ is a value that can be computed in accordance with a probability p disclosed in Non-Patent Document 1 described above. Non-Patent Document 1 states that, for example, when there are three words "the", "cat", and "sat", "on" is predicted as a fourth word, and a computation formula of the prediction probability p is described. The probability p(wt|wt−k, ..., wt+k) described in Non-Patent Document 1 is a correct answer probability when another word wt is predicted from a plurality of words wt−k, wt+k.

Meanwhile, the probability $P(w_j|d_i)$ shown in Equation (1) used in the present embodiment represents a correct answer probability that one word $w_j$ of n words is predicted from one text $d_i$ of m texts. Predicting one word $w_j$ from one text $d_i$ means that, specifically, when a certain text $d_i$ appears, a possibility of including the word $w_j$ in the text $d_i$ is predicted.

Note that since Equation (1) is symmetrical with respect to $d_i$ and $w_j$, a probability $P(d_i|w_j)$ that one text $d_i$ of m texts is predicted from one word $w_j$ of n words may be calculated. Predicting one text $d_i$ from one word $w_j$ means that, when a certain word $w_j$ appears, a possibility of including the word $w_j$ in the text $d_i$ is predicted.

In Equation (1), an exponential function value is used, where e is the base and the inner product of the word vector $\vec{w}$ and the text vector $\vec{d}$ is the exponent. Then, a ratio of an exponential function value calculated from a combination of a text $d_i$ and a word $w_j$ to be predicted to the sum of n exponential function values calculated from each combination of the text $d_i$ and n words $w_k$ (k=1, 2, ..., n) is calculated as a correct answer probability that one word $w_j$ is expected from one text $d_i$.

Here, the inner product value of the word vector $\vec{w_j}$ and the text vector $\vec{d_i}$ can be regarded as a scalar value when the word vector $\vec{w_j}$ is projected in a direction of the text vector $\vec{d_i}$, that is, a component value in the direction of the text vector $\vec{d_i}$ included in the word vector $\vec{w_j}$, which can be considered to represent a degree at which the word $w_j$ contributes to the text $d_i$. Therefore, obtaining the ratio of the exponential function value calculated for one word $W_j$ to the sum of the exponential function values calculated for n words $w_k$ (k=1, 2, . . . , n) using the exponential function value calculated using the inner product corresponds to obtaining the correct answer probability that one word $w_j$ of n words is predicted from one text $d_i$.

Note that here, a calculation example using the exponential function value using the inner product value of the word vector $\vec{w}$ and the text vector $\vec{d}$ as an exponent has been described. However, the exponential function value may not be used. Any calculation formula using the inner product value of the word vector $\vec{w}$ and the text vector $\vec{d}$ may be used. For example, the probability may be obtained from the ratio of the inner product values.

Next, the vector computation unit 12 computes the text vector $\vec{d_i}$ and the word vector $\vec{w_j}$ that maximize a value L of the sum of the probability $P(w_j|d_i)$ computed by Equation (1) for all the set S as shown in the following Equation (2). That is, the text vector computation unit 12A and the word vector computation unit 12B compute the probability $P(w_j|d_i)$ computed by Equation (1) for all combinations of the m texts and the n words, and compute the text vector $\vec{d_i}$ and the word vector $\vec{w_j}$ that maximize a target variable L using the sum thereof as the target variable L.

[Equation 2]

$$L = \sum_{d \in D} \sum_{w \in W} \#(w, d) \, p(w|d) \tag{2}$$

Maximizing the total value L of the probability $P(w_j|d_i)$ computed for all the combinations of the m texts and the n words corresponds to maximizing the correct answer probability that a certain word $w_j$ (j=1, 2, . . . , n) is predicted from a certain text $d_i$ (i=1, 2, . . . , m). That is, the vector computation unit 12 can be considered to compute the text vector $\vec{d_i}$ and the word vector $\vec{w_j}$ that maximize the correct answer probability.

Here, in the present embodiment, as described above, the vector computation unit 12 converts each of the m texts $d_i$ into a q-dimensional vector to compute the m texts vectors $\vec{d_i}$ including the q axis components, and converts each of the n words into a q-dimensional vector to compute the n word vectors $\vec{w_j}$ including the q axis components, which corresponds to computing the text vector $\vec{d_i}$ and the word vector $\vec{w_j}$ that maximize the target variable L by making q axis directions variable.

The index value computation unit 13 takes each of the inner products of the m text vectors $\vec{d_i}$ and the n word vectors $\vec{w_j}$ computed by the vector computation unit 12, thereby computing a similarity index value reflecting the relationship between the m texts $d_i$ and the n words $w_j$. In the present embodiment, as shown in the following Equation (3), the index value computation unit 13 obtains the product of a text matrix D having the respective q axis components ($d_{11}$ to $d_{mq}$) of the m text vectors $\vec{d_i}$ as respective elements and a word matrix W having the respective q axis components ($w_{11}$ to $w_{nq}$) of the n word vectors $\vec{w_j}$ as respective elements, thereby computing an index value matrix DW having m×n similarity index values as elements. Here, $W^t$ is the transposed matrix of the word matrix.

[Equation 3]

$$D = \begin{pmatrix} d_{11} & d_{12} & \cdots & d_{1q} \\ d_{21} & d_{22} & \cdots & d_{2q} \\ \vdots & \vdots & \ddots & \vdots \\ d_{m1} & d_{m2} & \cdots & d_{mq} \end{pmatrix} \quad W = \begin{pmatrix} w_{11} & w_{12} & \cdots & w_{1q} \\ w_{21} & w_{22} & \cdots & w_{2q} \\ \vdots & \vdots & \ddots & \vdots \\ w_{n1} & w_{n2} & \cdots & w_{nq} \end{pmatrix} \tag{3}$$

$$DW = D * W^t = \begin{pmatrix} dw_{11} & dw_{12} & \cdots & dw_{1n} \\ dw_{21} & dw_{22} & \cdots & dw_{2n} \\ \vdots & \vdots & \ddots & \vdots \\ dw_{m1} & dw_{m2} & \cdots & dw_{mn} \end{pmatrix}$$

Each element of the index value matrix DW computed in this manner may indicate which word contributes to which text and to what extent. For example, an element $dw_{12}$ in the first row and the second column is a value indicating a degree at which the word $w_2$ contributes to a text $d_1$. In this way, each row of the index value matrix DW can be used to evaluate the similarity of a text, and each column can be used to evaluate the similarity of a word. Details thereof will be described later.

Figure 2:
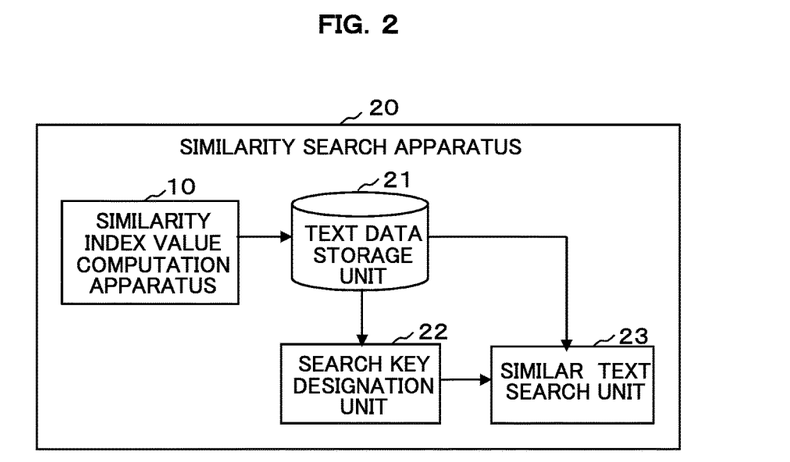
FIG. 2 is a block diagram illustrating a functional configuration example of a similarity search apparatus according to the embodiment.

Next, a description will be given of a similarity search apparatus using the similarity index value computation apparatus 10 according to the present embodiment configured as described above. FIG. 2 is a block diagram illustrating a functional configuration example of the similarity search apparatus 20 according to the present embodiment. As illustrated in FIG. 2, in addition to the similarity index value computation apparatus 10 illustrated in FIG. 1, the similarity search apparatus 20 of the present embodiment includes a text data storage unit 21 as a storage medium and a search key designation unit 22 and a similar text search unit 23 as a functional configuration.

Each of the functional blocks 22 to 23 can be configured by any of hardware, DSP, and software. For example, in the case of being configured by software, each of the functional blocks 22 to 23 actually includes a CPU, a RAM, a ROM, etc. of a computer, and is implemented by operation of a program stored in a recording medium such as a RAM, a ROM, a hard disk, or a semiconductor memory.

The text data storage unit 21 stores text data related to m texts together with the similarity index value computed by the similarity index value computation apparatus 10. Here, the text data storage unit 21 stores m×n similarity index values corresponding to values of the respective elements of the index value matrix DW computed by Equation (3) and text data related to m texts from which the similarity index value is computed.

The search key designation unit 22 designates one text from the m texts stored in the text data storage unit 21 as a search key. Designation of one text is performed when a user desiring to search for a similar text operates an operation unit (a keyboard, a mouse, a touch panel, etc.) provided in the similarity search apparatus 20. Specifically, a list of texts stored in the text data storage unit 21 is obtained and displayed on a display, and the user selects a desired text from the list to designate a text as a search key.

Note that the search key designation unit 22 may not be included in the similarity search apparatus 20. For example, the similarity search apparatus 20 maybe configured as a server apparatus connected to a communication network such as the Internet, the search key designation unit 22 may be provided in another terminal connected via the communication network, and information indicating specified content may be transmitted from the terminal to the similarity search apparatus 20.

When the search key designation unit 22 designates one text from the m texts stored in the text data storage unit 21 as the search key, the similar text search unit 23 sets the m−1 other texts except for the one text as a search target, searches the m−1 other texts for a text similar to the one designated text, and extracts the text. Specifically, the similar text search unit 23 sets n similarity index values related to the one text as a search key-related text index value group, sets n similarity index values related to each of the m−1 other texts as a search target-related text index value group, and determines a similarity between the search key-related text index value group and the search target-related text index value group. Then, a predetermined number of texts are extracted from the m−1 other texts as search results in descending order of the similarity. The predetermined number can be one or more arbitrary numbers.

Here, the search key-related text index value group including the n similarity index value related to the one text refers to n similarity index values included in a row related to the one text among the respective rows included in the index value matrix DW shown in Equation (3). For example, when a text $d_1$ is designated as one text, n similarity index values $dw_{11}$ to $dw_{1n}$ included in the first row of the index value matrix DW correspond to the search key-related text index value group.

In addition, the search target-related text index value group including the n similarity index values related to the other texts refers to n similarity index values included in rows related to the other texts. For example, when the text $d_1$ is designated as one text, n similarity index values $dw_{21}$ to $dw_{2n}$, $dw_{31}$ to $dw_{3n}$, . . . , $dw_{m1}$ to $dw_{mn}$ included in each of the rows other than the first row of the index value matrix DW correspond to the search target-related text index value group. Here, n similarity index values $dw_{21}$ to $dw_{2n}$ included in a second row of the index value matrix DW correspond to a search target-related text index value group related to another text $d_2$. In addition, n similarity index values $dw_{m1}$ to $dw_{mn}$ included in an mth row of the index value matrix DW correspond to a search target-related text index value group related to another text $d_m$.

The similar text search unit 23 computes each of similarities between the search key-related text index value group $dw_{11}$ to $dw_{1n}$ related to one text and m−1 search target-related text index value groups $dw_{21}$ to $dw_{2n}$, $dw_{31}$ to $dw_{3n}$, . . . , $dw_{m1}$ to $dw_{mn}$ related to the other texts, and extracts a predetermined number of texts from the m−1 other texts as search results in descending order of the similarity. Here, a known technology can be used for calculating the similarity. For example, it is possible to apply a method of calculating any of the Euclidean distance, the Mahalanobis distance, the cosine distance, etc.

The similarity search apparatus 20 configured as in FIG. 2 is useful for designating one arbitrary text from m texts for which the similarity index values are previously computed, and searching for another text similar to the designated text from the remaining m−1 texts. For example, the similarity search apparatus 20 is useful when desiring to search for another paper having similar content to that of a specific paper in a situation in which previously published paper data is stored in the text data storage unit 21 as m texts.

Figure 3:
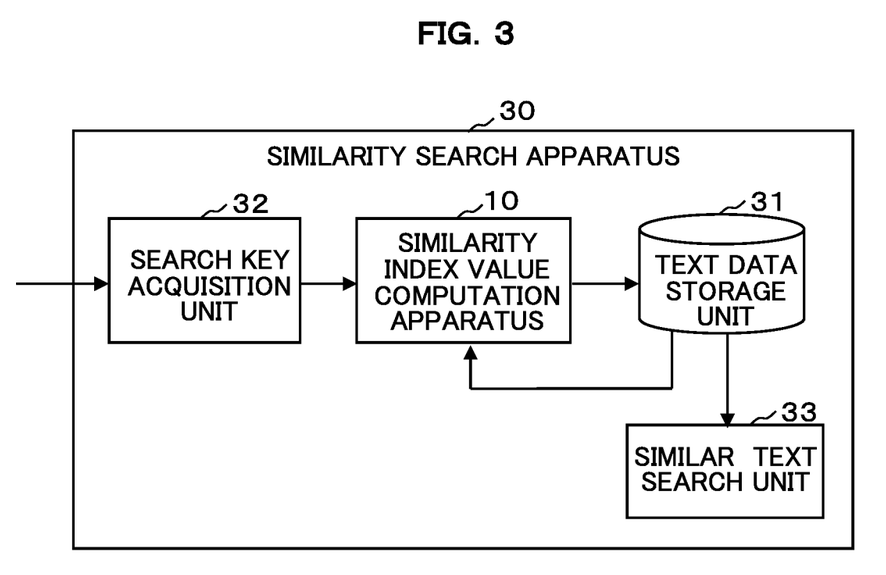
FIG. 3 is a block diagram illustrating another functional configuration example of a similarity search apparatus according to the embodiment.

FIG. 3 is a block diagram illustrating another functional configuration example of a similarity search apparatus 30 using the similarity index value computation apparatus 10 of the present embodiment. As illustrated in FIG. 3, in addition to the similarity index value computation apparatus 10 illustrated in FIG. 1, the similarity search apparatus 30 according to another configuration example includes a text data storage unit 31 as a storage medium and a search key acquisition unit 32 and a similar text search unit 33 as a functional configuration.

Each of the functional blocks 32 to 33 can be configured by any of hardware, DSP, and software. For example, in the case of being configured by software, each of the functional blocks 32 to 33 actually includes a CPU, a RAM, a ROM, etc. of a computer, and is implemented by operation of a program stored in a recording medium such as a RAM, a ROM, a hard disk, or a semiconductor memory.

The text data storage unit 31 stores the similarity index value computed by the similarity index value computation apparatus 10 and a plurality of pieces of text data. Here, the text data storage unit 31 stores a plurality of similarity index values corresponding to values of the respective elements of the index value matrix DW computed by Equation (3) and text data related to a plurality of texts from which the similarity index value is computed.

The search key acquisition unit 32 acquires text data designated as a search key. The text data acquired here is new text data different from the plurality of pieces of text data stored in the text data storage unit 31. An acquisition source of the new text data is arbitrary. In addition, a method of acquiring the new text data is arbitrary. For example, text data designated when the user desiring to search for a similar text operates an operation unit is acquired from an external terminal, a server, a storage, etc. connected to the similarity search apparatus 30 via a communication network.

When one piece of text data is acquired by the search key acquisition unit 32, the similarity index value computation apparatus 10 sets the text data acquired by the search key acquisition unit 32 as one text (text of the search key), and sets a plurality of pieces of text data stored in the text data storage unit 31 as m−1 other texts (texts to be searched), thereby computing m×n similarity index values by Equation (3).

The similarity index values computed by the similarity index value computation apparatus 10 are stored in the text data storage unit 31 together with new text data. That is, the new text data is additionally stored, and the similarity index values are updated and stored. Note that when subsequent new text data is acquired by the search key acquisition unit 32, the plurality of pieces of text data (existing text data and added text data) stored in the text data storage unit 31 in this way is used as m−1 pieces of text data (where a value of m is one larger than that of a previous time).

Using the m×n similarity index values computed by the similarity index value computation apparatus 10 and stored in the text data storage unit 31, the similar text search unit 33 searches for a text similar to the one text acquired as the search key by the search key acquisition unit 32 from existing texts stored in the text data storage unit 31 and extracts the text.

Specifically, the similar text search unit 33 determines a similarity between a search key-related text index value group including n similarity index values related to one text acquired by the search key acquisition unit 32 and a search target-related text index value group including n similarity index values related to another existing text stored in the text data storage unit 31. Then, a predetermined number of texts are extracted from m−1 other texts stored in the text data storage unit 31 as search results in descending order of the similarity.

Here, when one text acquired by the search key acquisition unit 32 is set to $d_1$, and other existing texts stored in the text data storage unit 31 are set to $d_2$ to $d_m$, n similarity index values $dw_{11}$ to $dw_{1n}$ included in the first row among the respective rows included in the index value matrix DW computed by the similarity index value computation apparatus 10 according to Equation (3) correspond to a search key-related text index value group. In addition, n similarity index values $dw_{21}$ to $dw_{2n}$, $dw_{31}$ to $dw_{3n}$, ..., $dw_{m1}$ to $dw_{mn}$ included in each of the second row and subsequent rows of the index value matrix DW correspond to a search target-related text index value group.

The similar text search unit 33 computes each of similarities between a search key-related text index value group $dw_{11}$ to $dw_{1n}$ related to one text and m−1 search target-related text index value groups $dw_{21}$ to $dw_{2n}$, $dw_{31}$ to $dw_{3n}$, ..., $dw_{m1}$ to $dw_{mn}$ related to other texts, and extracts a predetermined number of texts from m−1 other texts as search results in descending order of the similarity.

The similarity search apparatus 30 configured as in FIG. 3 is useful for searching for a text similar to a new text acquired as a search key from m−1 texts for which similarity index values are previously computed. For example, the similarity search apparatus 30 is useful when desiring to search for a paper having similar content to that of a newly acquired paper in a situation in which previously published paper data is stored in the text data storage unit 31 as m−1 texts.

Figure 4:
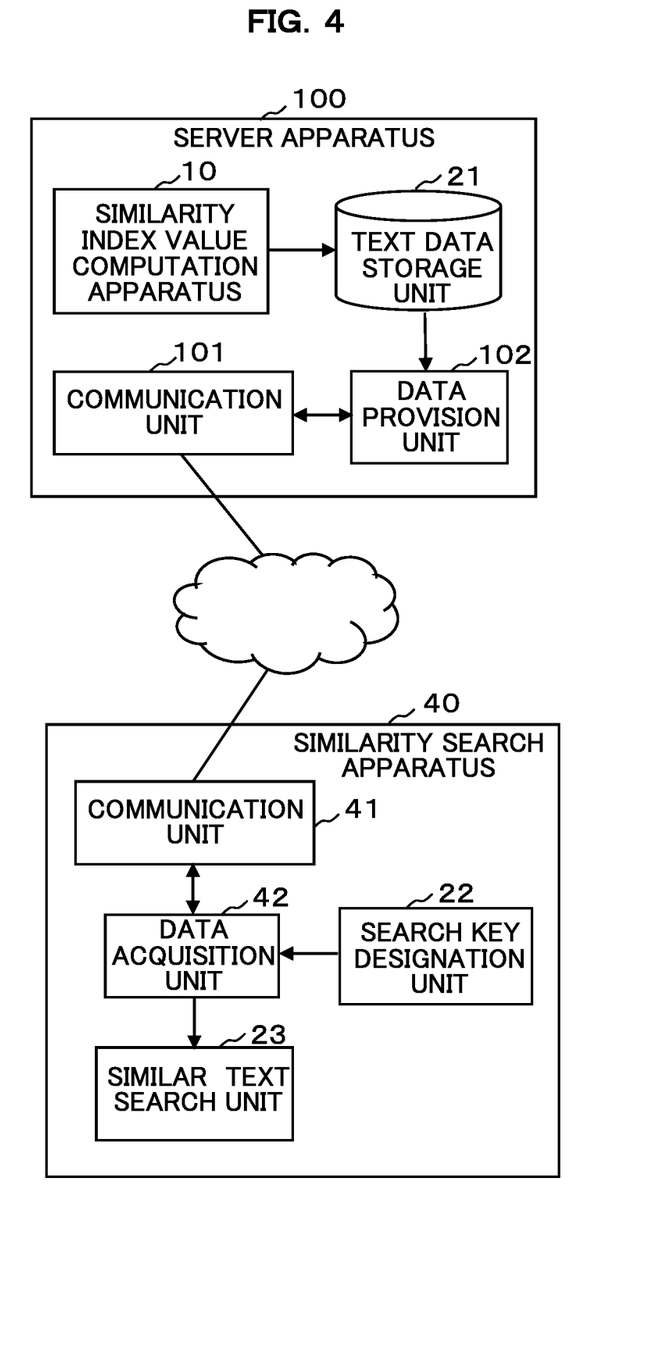
FIG. 4 is a block diagram illustrating another functional configuration example of a similarity search apparatus according to the embodiment.

Note that in the embodiment of FIG. 2, a description has been given of a configuration in which the similarity search apparatus 20 includes the similarity index value computation apparatus 10 and the text data storage unit 21. However, the invention is not limited thereto. That is, the similarity index value computation apparatus 10 and the text data storage unit 21 may be configured as apparatuses different from a similarity search apparatus having the search key designation unit 22 and the similar text search unit 23. FIG. 4 is a diagram illustrating one configuration example of this case.

As illustrated in FIG. 4, the similarity index value computation apparatus 10 and the text data storage unit 21 are included in a server apparatus 100 connected to a communication network such as the Internet. The server apparatus 100 further includes a communication unit 101 and a data provision unit 102, reads text data and a similarity index value from the text data storage unit 21, and provides the read text data and similarity index value to the similarity search apparatus 40 in response to a data acquisition request from the similarity search apparatus 40 connected to the communication network.

In addition to the search key designation unit 22 and the similar text search unit 23, the similarity search apparatus 40 further includes a communication unit 41 and a data acquisition unit 42. The data acquisition unit 42 acquires text data and a similarity index value from the text data storage unit 21 of the server apparatus 100 by transmitting a data acquisition request to the server apparatus 100 via the communication unit 41. The similarity index value stored in the text data storage unit 21 is computed by the similarity index value computation apparatus 10 and stored in advance.

The data acquisition unit 42 acquires, as a search key-related text index value group, n similarity index values related to one document designated as a search key by the search key designation unit 22 and acquires n similarity index values related to each of the m−1 other documents as a search target-related text index value group. Note that, for example, designation of the search key by the search key designation unit 22 is performed by accessing the server apparatus 100 from the similarity search apparatus 40 to acquire a list of texts stored in the text data storage unit 21, displaying the list on a display, and selecting a desired text from the list by the user.

When one text is designated as a search key by the search key designation unit 22 from m texts stored in the text data storage unit 21 as described above, the similar text search unit 23 determines a similarity between a search key-related text index value group including n similarity index values related to one text and a search target-related text index value group including n similarity index values related to each of the m−1 other texts using the similarity index values acquired by the data acquisition unit 42 from the server apparatus 100, and extracts a predetermined number of texts from the m−1 other texts as search results in descending order of the similarity.

In addition, in the above-described embodiments, a description has been given of an example in which each row of the index value matrix DW computed by the similarity index value computation apparatus 10 is used as a unit, and n similarity index values are used as a text index value group to search for a similar text. However, the invention is not limited thereto. For example, each column of the index value matrix DW computed by the similarity index value computation apparatus 10 may be used as a unit, and m similarity index values may be used as a word index value group to search for a similar word.

Figure 5:
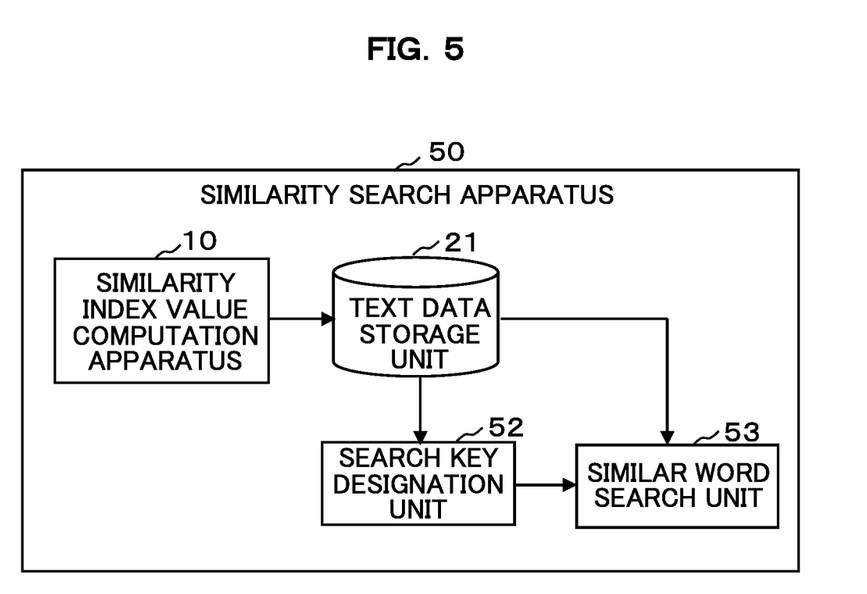
FIG. 5 is a block diagram illustrating another functional configuration example of a similarity search apparatus according to the embodiment.

FIG. 5 is a block diagram illustrating a functional configuration example of a similarity search apparatus 50 configured to search for a similar word. In FIG. 5, components denoted by the same reference numerals as those illustrated in FIG. 2 have the same functions, and thus redundant description will be omitted here. As illustrated in FIG. 5, in addition to the similarity index value computation apparatus 10 illustrated in FIG. 1, the similarity search apparatus 50 includes a text data storage unit 21 as a storage medium and a search key designation unit 52 and a similar word search unit 53 as a functional configuration.

Each of the functional blocks 52 to 53 can be configured by any of hardware, a DSP, and software. For example, in the case of being configured by software, each of the functional blocks 52 to 53 actually includes a CPU, a RAM, a ROM, etc. of a computer, and is implemented by operation of a program stored in a recording medium such as a RAM, a ROM, a hard disk, or a semiconductor memory.

The search key designation unit 52 designates one word as a search key from n words included in text data stored in the text data storage unit 21. Designation of one word is performed when the user desiring to search for a similar word operates an operation unit provided in the similarity search apparatus 50. Specifically, a list of words included in a text stored in the text data storage unit 21 is acquired and displayed on a display, and a word desired by the user is selected from the list, thereby designating a word as a search key. Note that to display a word list in this manner, n pieces of word data may be stored in the text data storage unit 21 separately from m pieces of text data.

Note that the search key designation unit 52 may not be included in the similarity search apparatus 50. For example, the similarity search apparatus 50 maybe configured as a server apparatus connected to a communication network such as the Internet, the search key designation unit 52 may be provided in another terminal connected via the communication network, and information indicating designation content may be transmitted from the terminal to the similarity search apparatus 50.

When one of n words is designated as a search key by the search key designation unit 52, the similar word search unit 53 sets then n−1 other words except for the one word as a search target, searches for a word similar to the one word from the n−1 other words, and extracts the word. Specifically, the similar word search unit 53 sets m similarity index values related to one word as a search key-related word index value group, sets m similarity index values related to each of the n−1 other words as a search target-related word index value group, and determines a similarity between the search key-related word index value group and the search target-related word index value group. Then, a predetermined number of words are extracted from the n−1 other words as search results in descending order of the similarity.

The similarity search apparatus 50 configured as in FIG. 5 is useful for designating one arbitrary word from n words included in m texts for which similarity index values are previously computed, and searching for another word similar to the designated word from the n−1 remaining words. The similar word mentioned here may correspond to an equivalent or a synonym for the word of the search key, or may not correspond thereto. According to the present embodiment, it is possible to search for a word having a similar tendency to be used in a text as a similar word.

In addition, the embodiment is merely an example of a specific embodiment for carrying out the invention, and the technical scope of the invention should not be interpreted in a limited manner. That is, the invention can be implemented in various forms without departing from the gist or the main features thereof.

REFERENCE SIGNS LIST

10 Similarity index value computation apparatus
11 Word extraction unit
12 Vector computation unit
12A Text vector computation unit
12B Word vector computation unit
13 Index value computation unit
20, 30, 40, 50 Similarity search apparatus
21, 31 Text data storage unit
22, 52 Search key designation unit
23, 33 Similar text search unit
32 Search key acquisition unit
42 Data acquisition unit

The invention claimed is:

1. A similarity index value computation apparatus that computes a similarity index value to be used when computing a similarity between a search key and a text or a word to be searched, comprising:
   a word extraction unit that analyzes m, wherein m is an arbitrary integer of 2 or more, texts and extracts n, wherein n is an arbitrary integer of 2 or more, words from the m texts;
   a text vector computation unit that converts each of the m texts into a q-dimension vector, wherein q is an arbitrary integer of 2 or more, according to a predetermined rule, thereby computing m text vectors including q axis components;
   a word vector computation unit that converts each of the n words into a q-dimension vector according to a predetermined rule, thereby computing n word vectors including q axis components; and
   an index value computation unit that calculates each of inner products of the m text vectors and the n word vectors, thereby computing m×n similarity index values reflecting a relationship between the m texts and the n words.

2. The similarity index value computation apparatus according to claim 1, characterized in that the text vector computation unit and the word vector computation unit compute a probability that one of the m texts is predicted from one of the n words or a probability that one of the n words is predicted from one of the m texts for all combinations of the m texts and the n words, set a total value thereof as a target variable, and compute a text vector and a word vector maximizing the target variable.

3. The similarity index value computation apparatus according to claim 2, further comprising:
   the text vector computation unit computes m text vectors including q axis components, thereby calculating a text matrix having q axis components of each of the m text vectors as respective elements;
   the word vector computation unit computes n word vectors including q axis components, thereby calculating a word matrix having q axis components of each of the n word vectors as respective elements; and
   the index value computation unit calculates a product of the text matrix calculated by the text vector computation unit and the word matrix calculated by the word vector computation unit, thereby computing an index value matrix having m× n similarity index values as respective elements.

4. The similarity index value computation apparatus according to claim 1, further comprising:
   the text vector computation unit computes m text vectors including q axis components, thereby calculating a text matrix having q axis components of each of the m text vectors as respective elements;
   the word vector computation unit computes n word vectors including q axis components, thereby calculating a word matrix having q axis components of each of the n word vectors as respective elements; and
   the index value computation unit calculates a product of the text matrix calculated by the text vector computation unit and the word matrix calculated by the word vector computation unit, thereby computing an index value matrix having m×n similarity index values as respective elements.

5. A similarity search apparatus, comprising:
   a word extraction unit that analyzes m, wherein m is an arbitrary integer of 2 or more, texts and extracts n, wherein n is an arbitrary integer of 2 or more, words from the m texts;
   a text vector computation unit that converts each of the m texts into a q-dimension vector, wherein q is an arbitrary integer of 2 or more, according to a predetermined rule, thereby computing m text vectors including q axis components;
   a word vector computation unit that converts each of the n words into a q-dimension vector according to a predetermined rule, thereby computing n word vectors including q axis components;
   an index value computation unit that calculates each of inner products of the m text vectors and the n word vectors, thereby computing m×n similarity index values reflecting a relationship between the m texts and the n words; and
   a similar text search unit that sets m−1 other texts except for one of the m texts as search targets when the one text is designated as a search key from the m texts, determines a similarity between a search key-related text index value group including n similarity index values related to the one text and a search target-related text index value group including n similarity index values related to each of the m−1 other texts, and extracts a predetermined number of texts from the m−1 other texts as search results in descending order of the similarity.

6. The similarity search apparatus according to claim 5, further comprising:
a text data storage unit that stores the similarity index values computed by the similarity index value computation apparatus and text data related to the m texts, characterized in that the similar text search unit sets the m−1 other texts except for the one text as search targets when the one text is designated as the search key from the m texts stored in the text data storage unit, determines a similarity between a search key-related text index value group including n similarity index values related to the one text and a search target-related text index value group including n similarity index values related to each of the m−1 other texts, and extracts a predetermined number of texts from the m−1 other texts as search results in descending order of the similarity.

7. The similarity search apparatus according to claim 5, further comprising:
a text data storage unit that stores the similarity index values computed by the similarity index value computation apparatus and a plurality of pieces of text data; and
a search key acquisition unit that acquires text data designated as the search key,
characterized in that the similarity index value computation apparatus computes the similarity index values using text data acquired by the search key acquisition unit as the one text and text data stored in the text data storage unit as the m−1 other texts, and
the similar text search unit determines a similarity between a search key-related text index value group including n similarity index values related to the one text acquired by the search key acquisition unit and a search target-related text index value group including n similarity index values related to each of the m−1 other texts stored in the text data storage unit, and extracts a predetermined number of texts as search results from the m−1 other texts stored in the text data storage unit in descending order of the similarity.

8. The similarity search apparatus according to claim 7, characterized by further comprising:
sets n−1 other words other than one of the n words as a search target when the one word is designated as a search key from the n words, determines a similarity between a search key-related word index value group including m similarity index values related to the one word and a search target-related word index value group including m similarity index values related to each of the n−1 other words, and extracts a predetermined number of words as search results from the n−1 other words in descending order of the similarity.

9. The similarity search apparatus according to claim 5, characterized by further comprising:
a similar word search unit that sets n−1 other words other than one of the n words as a search target when the one word is designated as a search key from the n words, determines a similarity between a search key-related word index value group including m similarity index values related to the one word and a search target-related word index value group including m similarity index values related to each of the n−1 other words, and extracts a predetermined number of words as search results from the n−1 other words in descending order of the similarity.

10. A similarity search apparatus characterized by comprising:
a data acquisition unit that acquires, from a text data storage unit storing similarity index values reflecting a relationship between m, wherein m is an arbitrary integer of 2 or more, texts and n, wherein n is an arbitrary integer of 2 or more, words extracted from the m texts and text data related to the m texts, the text data and the similarity index values; and
a similar text search unit that uses the data acquired by the data acquisition unit to set m−1 other texts except for one of the m texts as search targets when the one text is designated as a search key from the m texts, determines a similarity between a search key-related text index value group including n similarity index values related to the one text and a search target-related text index value group including n similarity index values related to each of the m−1 other texts, and extracts a predetermined number of texts as search results from the m−1 other texts in descending order of the similarity,
wherein
the similarity index value is a value computed by calculating each of inner products of m text vectors obtained by converting each of the m texts into a q-dimension vector, wherein q is an arbitrary integer of 2 or more, according to a predetermined rule and n word vectors obtained by converting each of the n words into a q-dimension vector according to a predetermined rule.

11. A similarity search apparatus according to claim 10, characterized in that the text vector and the word vector are vectors computed by computing a probability that one of the m texts is predicted from one of the n words or a probability that one of the n words is predicted from one of the m texts for all combinations of the m texts and the n words, setting a total value thereof as a target variable, and maximizing the target variable.

12. A non-transitory computer readable media storing a similarity index value computation program that computes a similarity index value to be used when computing a similarity between a search key and a text or a word to be searched, the similarity index value computation program being programmed to cause a system of electronic computer hardware in combination with software to perform operations comprising:
analyzes m, wherein m is an arbitrary integer of 2 or more, texts and extracts n, wherein n is an arbitrary integer of 2 or more, words from the m texts;
converts each of the m texts into a q-dimension vector, wherein q is an arbitrary integer of 2 or more, according to a predetermined rule, and converts each of the n words into a q-dimension vector according to a predetermined rule, thereby computing m text vectors including q axis components and n word vectors including q axis components; and
calculates each of inner products of the m text vectors and the n word vectors, thereby computing a similarity index value reflecting a relationship between the m texts and the n words.

13. The non-transitory computer readable media storing the similarity index value computation program according to claim 12, the operations further comprising determine a probability that one of the m texts is predicted from one of the n words or a probability that one of the n words is predicted from one of the m texts for all combinations of the m texts and the n words, sets a total value thereof as a target variable, and computes a text vector and a word vector maximizing the target variable.

14. A similarity search apparatus characterized by comprising:
- a word extraction unit that analyzes m, wherein m is an arbitrary integer of 2 or more, texts and extracts n, wherein n is an arbitrary integer of 2 or more, words from the m texts;
- a text vector computation unit that converts each of the m texts into a q-dimension vector, wherein q is an arbitrary integer of 2 or more, according to a predetermined rule, thereby computing m text vectors including q axis components;
- a word vector computation unit that converts each of the n words into a q-dimension vector according to a predetermined rule, thereby computing n word vectors including q axis components;
- an index value computation unit that calculates each of inner products of the m text vectors and the n word vectors, thereby computing m×n similarity index values reflecting a relationship between the m texts and the n words; and
- a similar text search unit that sets m−1 other texts except for one of the m texts as search targets when the one text is designated as a search key from the m texts, determines a similarity between a search key-related text index value group including n similarity index values related to the one text and a search target-related text index value group including n similarity index values related to each of the m−1 other texts, and extracts a predetermined number of texts from the m−1 other texts as search results in descending order of the similarity;

wherein the text vector computation unit and the word vector computation unit compute a probability that one of the m texts is predicted from one of the n words or a probability that one of the n words is predicted from one of the m texts for all combinations of the m texts and the n words, set a total value thereof as a target variable, and compute a text vector and a word vector maximizing the target variable.

15. A similarity search apparatus, comprising:
- a word extraction unit that analyzes m, wherein m is an arbitrary integer of 2 or more, texts and extracts n, wherein n is an arbitrary integer of 2 or more, words from the m texts;
- a text vector computation unit that converts each of the m texts into a q-dimension vector, wherein q is an arbitrary integer of 2 or more, according to a predetermined rule, thereby computing m text vectors including q axis components;
- a word vector computation unit that converts each of the n words into a q-dimension vector according to a predetermined rule, thereby computing n word vectors including q axis components;
- an index value computation unit that calculates each of inner products of the m text vectors and the n word vectors, thereby computing m×n similarity index values reflecting a relationship between the m texts and the n words; and
- a similar word search unit that sets n−1 other words other than one of the n words as a search target when the one word is designated as a search key from the n words, determines a similarity between a search key-related word index value group including m similarity index values related to the one word and a search target-related word index value group including m similarity index values related to each of the n−1 other words, and extracts a predetermined number of words as search results from the n−1 other words in descending order of the similarity.

* * * * *